United States Patent [19]
Doi et al.

[11] Patent Number: 5,579,374
[45] Date of Patent: Nov. 26, 1996

[54] INDEPENDENT CELL SYSTEM OF FORWARD AND REVERSE LINKS

[75] Inventors: Nobukazu Doi, Hachioji; Takashi Yano, Tokorozawa, both of Japan

[73] Assignees: Hitachi, Ltd.; Hitachi Denshi Kabushiki Kaisha, both of Tokyo, Japan

[21] Appl. No.: 299,630

[22] Filed: Sep. 2, 1994

[30] Foreign Application Priority Data

Sep. 3, 1993 [JP] Japan .................................. 5-219537

[51] Int. Cl.⁶ .......................................... H04Q 7/36
[52] U.S. Cl. ............................. 379/59; 379/60; 455/33.1
[58] Field of Search ................................. 379/58, 59, 63, 379/60; 455/33.4, 33.1, 54.1, 56.1, 33.2, 54.2

[56] References Cited

U.S. PATENT DOCUMENTS

| | | | |
|---|---|---|---|
| 4,723,266 | 2/1988 | Perry ........................ | 379/63 X |
| 4,893,327 | 1/1990 | Stern et al. ................ | 379/59 |
| 4,975,939 | 12/1990 | Sasaki ....................... | 379/59 X |
| 5,020,130 | 5/1991 | Grube et al. ............... | 379/63 X |
| 5,179,571 | 1/1993 | Schilling .................... | 375/205 |
| 5,212,822 | 5/1993 | Fukumine et al. ......... | 455/33.1 |
| 5,357,559 | 10/1994 | Kallin et al. .............. | 379/59 |
| 5,379,447 | 1/1995 | Bonta et al. ............... | 455/56.1 X |

FOREIGN PATENT DOCUMENTS 63-87837  4/1988  Japan .

OTHER PUBLICATIONS

"Spectrum Spread Communication System", Mitsuo Yokoyama, Kagaku Gijutsu Shuppan Sha.

Primary Examiner—Curtis Kuntz
Assistant Examiner—William G. Trost
Attorney, Agent, or Firm—Antonelli, Terry, Stout & Kraus

[57] ABSTRACT

A radio communication system includes: a plurality of forward base stations each forming a macrocell; a plurality of reverse base station each forming a microcell in the associated macrocell; and a mobile communication control office connected between the forward base stations and a public or local area network. The mobile communication control office monitors the received signal's levels of signals sent from portable wireless terminals located in the reverse base stations, thereby specifying each reverse base station which is to exercise jurisdiction over the associated portable wireless terminals and performing the handover control. Since the reverse base station is installed every microcell, the transmitted power of each portable wireless terminal has only to be weak. Thus, the installation number of forward base stations and mobile communication control offices is increased, whereby the service area can be readily enlarged.

5 Claims, 6 Drawing Sheets

INDEPENDENT CELL SYSTEM OF FORWARD AND REVERSE LINKS

BACKGROUND OF THE INVENTION

1. Field of the Invention

The present invention relates, in general, to a radio communication system, and more particularly to a mobile communication system which establishes a radio communication connection with respect to signals sent from mobile wireless terminals. The mobile wireless terminals include, for example, cellular phones, portable telephones, and wireless LAN system which establish a communication connection for providing data transmission with respect to data sent from a computer or an office automation terminal through a wireless link, and more particularly of a type which includes a radio communication system having an independent cell structure containing forward and reverse links in which a service area for reverse links, each leading from the associated terminal to a radio base station, and a service area for forward links each leading from a radio base station to the associated terminal, are constructed using different cells.

2. Description of the Related Art

A conventional communication system which utilizes wireless links, and which is relatively economical is described in JP-A-63-87837.

The above-mentioned prior art system includes a local radio station covering a relatively wide area divided into a plurality of service areas (cells). The radio station performs a transmission operation using a relatively powerfull radio wave, which can be received by a terminal (e.g. a portable wireless terminal) in an arbitrary position within the plurality of cells. A plurality of relay radio stations each of which communicates with a terminal located in an associated cell using a weak radio wave within the above-mentioned individual cells in the area of coverage. In this connection, the local radio station is coupled with the relay radio stations through the channels.

The reverse signal, which has been transmitted from each wireless terminal using the weak radio wave, is received by the relay radio station within the associated cell and then is relayed to the local radio station through the associated channel. The forward signal which is to be transmitted from the local radio station to the terminal of interest is transmitted into the air using a transmitted power greater than that of the transmitted radio wave sent from each wireless terminal to be directly received by the terminal of interest.

The above-mentioned radio communication system is constructed in such a way that the reverse and forward links are made independent of each other by utilizing both the portable wireless terminals each having a function of transmitting the weak radio wave, and a plurality of radio equipment (relay radio stations) each of which is of a relatively weak power type, whereby the economical radio data communication is performed.

Undesirably, in the prior art shown in JP-A-63-87837, since the single local radio station is installed for the plurality of relay radio stations, each of which is installed in-house and operates to relay the very weak radio wave, the range of the service area is necessarily limited to the range in which the radio wave transmitted from the local radio station can be received by each terminal. Thus, the above-mentioned prior art is unsuitable with application to a communication system in which, as in case of cellular phones, the portable telephones, and the like, a large number of main base stations (local radio stations) are provided, and the service areas are repeatedly arranged, whereby the extensive service area is covered. In addition, the above-mentioned prior art is unsuitable for use with "the handover technique", which is essential to the cellular phone system, and the portable telephone system for example, and is utilized to hold the communication, when the terminal of interest is moved from one service area to another service area, without any interruption of the communication.

Incidentally, in the handover technique, disclosed, for example, in U.S. Pat. No. 5,179,571, there is a system in which the level of the received signal of the pilot signal sent from the radio station is monitored by each portable wireless terminal, and handover is performed utilizing the change in state of the received signal's level.

In the case where the handover method is intended to be applied to the communication system disclosed in JP-A-63-87837, the so-called "near-far problem" arises between the transmitted signal from the local radio station and the pilot signal transmitted by each weak-wave-relay radio station. That is, in the portable wireless terminal, which is located in the vicinity of the local radio station, since the level of the signal sent from the local radio station is too high, the pilot signal sent from the associated weak-wave-relay radio station can not be received. On the other hand, in the portable wireless terminal which is located far from the local radio station and in the vicinity of the associated relay radio station, since the level of the pilot signal sent from the associated weak-wave-relay radio station is too high, the signal sent from the local radio station can not be received. Therefore, it becomes difficult to realize the handover.

SUMMARY OF THE INVENTION

It is therefore an object of the present invention to provide a radio communication system in which the network can be economically constructed and the handover control between the cells can be performed.

It is another object of the present invention to provide a mobile wireless communication system in which the reverse and forward links are distributed with the cells independent of each other so that the mobile communication can be performed in the relatively extensive area.

In order to attain the above-mentioned objects, the radio communication system according to the present invention includes: a plurality of forward base stations each forming a macrocell; a plurality of reverse base stations connected, in each macrocell, to the associated forward base station through respective channels, each of the plurality of reverse base stations forming a microcell; and at least one mobile communication control office connected between the forward base stations and a public or local area network, so that the at least one mobile communication control office monitors the received signal levels of signals sent from mobile wireless terminals (portable wireless terminals and the like) located in the reverse base stations, whereby both the identification of each reverse base station, which is to exercise jurisdiction over the associated mobile wireless terminals, and the handover control are performed.

Incidentally, to the radio communication system of the present invention, as for the multiple access method for the mobile wireless terminals which is available to each of the above-mentioned radio base stations, for example, a CDMA (Code Division Multiple Access) method can be applied. In the CDMA method, the peculiar codes are previously assigned to a plurality of mobile wireless terminals, and under this condition, the equipment for transmission utilizes the same carrier frequency for a modulated signal to be sent to each wireless terminal and transmits those modulated signals to the individual wireless terminals with those modulated signals subjected to the spectrum spread with the codes peculiar to the individual terminals. In addition, each of the mobile wireless terminals on the receiving side is made synchronized in the spectrum spread code with the equipment for transmission, and then subjects the received signal to the spectrum de-spread with the associated peculiar code, thereby discriminating the received signal through the associated link.

Both the CDMA method and the spectrum spread method are, for example, described in detail in an article "SPECTRUM SPREAD COMMUNICATION SYSTEM" by Mitsuo Yokoyama, Kagaku Gijutsu Shuppan Sha, 1988.

In the radio communication system of the present invention, the signal of interest sent from the public or local area network is transmitted to the associated forward base station via the mobile communication control office to be transmitted to the objective mobile wireless terminal located in the service area (the macrocell) of the forward base station by utilizing the CDMA method. A plurality of reverse base stations are installed in each microcell so that each macrocell is divided into a plurality of microcells with each reverse base station as a center. Each mobile wireless terminal transmits the signal to the associated reverse base station, using the CDMA method, in which the microcell is regarded as the service area, the associated reverse base station transmits the received signal sent from the wireless terminal to the forward base station which is coupled to the associated forward base station through the channel, and the forward base station transfers the signal thus received to the mobile communication control office, which transmits the signal thus transferred to the public or local area network.

The signal transmitted from the forward base station to the mobile wireless terminal can be synchronized with the associated spectrum spread code used in the spectrum spread. Now, if the spectrum spread codes are the orthogonal codes, the co-channel interference between the channels used to transmit the signals to the respective mobile wireless terminals is eliminated. As a result, it is possible to increase the number of channels which are connectable in the cell.

For example, the specific case where the signals X0, X1, X2 and X3 are respectively sent from one forward base station to the four mobile wireless terminals is now considered. At this time, when the orthogonal codes assigned to the respective mobile wireless terminals are W0, W1, W2 and W3, the four signals transmitted from the forward base station are expressed by the following Expression.

$$S = W0 \times X0 + W1 \times X1 + W2 \times X2 + W3 \times X3 \qquad \text{Expression 1}$$

Now, the receiving operation in the mobile wireless terminal to which the orthogonal code W1 is previously assigned can be realized in such a way that the mobile wireless terminal of interest is made synchronized in the spectrum spread code with the equipment for transmission, and under this condition, the inner product of the transmitted signal expressed by Expression 1 and the orthogonal code W1 is carried out.

$$W1 \cdot S = W1 \cdot W0 \times X0 + W1 \cdot W1 \times X1 + W1 \cdot W2 \times X2 + W1 \cdot W3 \times X3 \qquad \text{Expression 2}$$

From the foregoing, in the forward links through which the signals are transmitted from the forward base station to the mobile wireless terminals, the spectrum spread codes assigned to the respective mobile wireless terminals are synchronized with each other, and also the spectrum spread codes are made the orthogonal codes, whereby the co-channel interference between the channels can be eliminated.

On the other hand, in the reverse links through which the signals are transmitted from the mobile wireless terminals to the associated reverse base station, from the reason that the distances between the individual mobile wireless terminals and the reverse base station are different from one another, and so forth, it is difficult that the mobile wireless terminals transmit the respective signals so as for the transmitted signals to be able to be synchronized with one another in the associated reverse base station.

In the case of the asynchronous transmission, the co-channel interference between the channels having the orthogonal codes is large, and thus, the orthogonal codes can not be applied to the spectrum spread. For this reason, in the case of the reverse links, to the transmission of the signals from the mobile wireless terminals to the reverse base station, in general, the pseudo-noise sequence such as the M-sequence in which the co-channel interference between the channels is small is applied. Thus, the maximum number of channels which are connectable in the forward links can be made several times as large as the maximum number of channels which are connectable in the reverse links.

According to the structure of the present invention, the single forward base station was provided in the prior art, whereas in the present invention, a plurality of forward base stations are provided, and also a plurality of mobile communication control offices are provided which are used to connect between the forward base stations, whereby the service area can be readily enlarged.

In addition, the mobile communication control office specifies the relationship between the mobile wireless terminals and the associated reverse base station, and switches the reverse base station to be connected to the mobile wireless terminals, thereby realizing the behavior of handover. Therefore, the mobile wireless terminal can be freely moved within the service area while maintaining the communication. In addition, in the present invention, since the registration of the positions of the mobile wireless terminals can be processed in units of macrocell corresponding to the forward base station, the control for the position management of the terminals becomes easy as compared with the prior art system in which the position registration is performed in units of microcell corresponding to the reverse base station.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
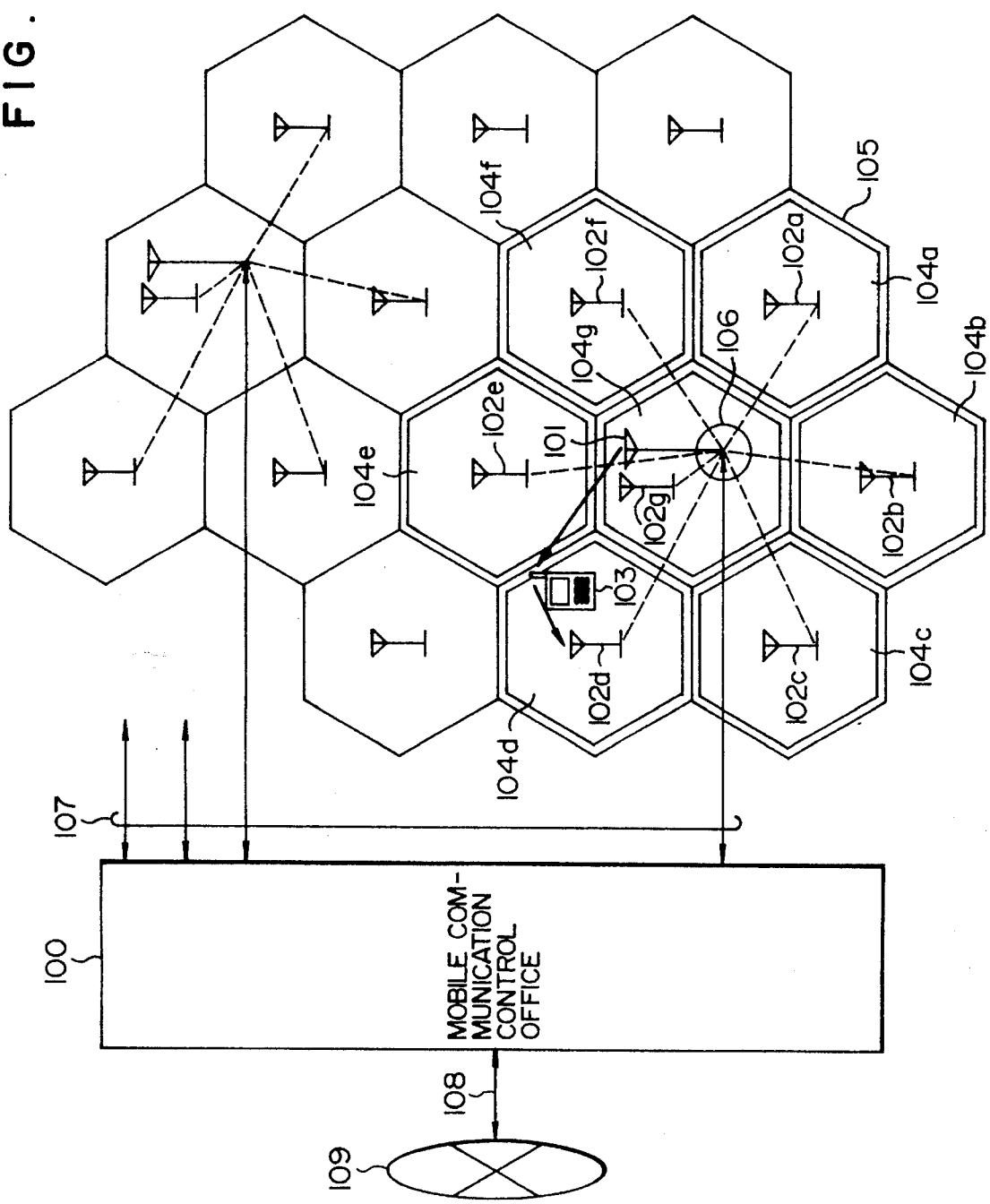
FIG. 1 is a schematic view showing the whole structure of a network of one embodiment of a radio communication system according to the present invention.

FIG. 1 shows the structure of one embodiment of a radio communication system having an independent cell structure equipped with forward and reverse links according to the present invention.

As shown, the radio communication system of the FIG. 1 embodiment includes, but is not limited to, a mobile communication control office 100, a plurality of forward base stations 101 each of which are installed in correspondence to macrocells 105, and a plurality of reverse base stations 102 (102a, 102b, . . . , 102g) which are installed in correspondence to microcells 104a, 104b, . . . , 104g forming the associated macrocell 105. The reference numeral 103 designates a portable wireless terminal which operates to transmit a signal, with relatively weak electric power, which can be received by the reverse base station 102d nearest the portable wireless terminal 103, i.e., the radio base station in the microcell in which the terminal 103 is located at present.

Each forward base station 101 operates to transmit a signal with the relatively powerful electric power so that the transmitted signal is able to be received by all the portable wireless terminals 103 located in the associated macrocell 105. The reverse base stations 102, each of which are installed in correspondence to the microcells in associated macrocells, are coupled to the forward base station 101 of the associated macrocell through respective channels 106 each represented by a broken line. In addition, those forward base stations are coupled to the mobile communication control office 100 through respective channels 107. The mobile communication control office 100 is connected to a public or local area network (LAN) 109 through a channel 108 and operates to monitor, all the time, in which cells the individual portable wireless terminals 103 are located at present and also to control the transmission and receiving of the call, the handover and the like.

Figure 2:
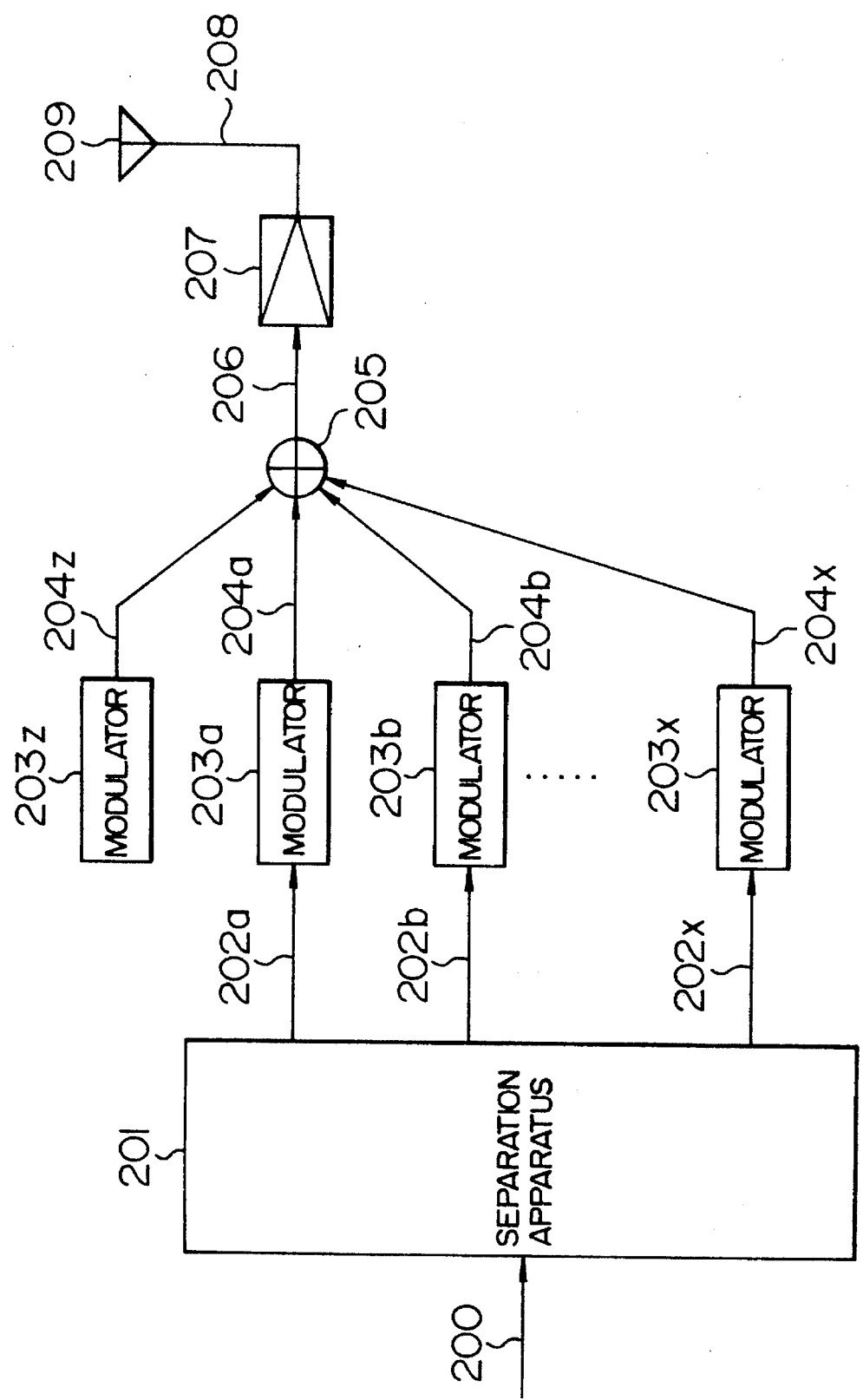
FIG. 2 is a block diagram showing a configuration of a forward base station 101.

FIG. 2 shows an example of a configuration of the forward base station 101 shown in FIG. 1.

In the figure, the reference numeral 201 designates a separation apparatus which operates to separate a multiplexing signal, which has been sent on the channel 107 from the mobile communication control office 100, into a plurality of signals 202a, 202b, . . . , 202x corresponding to the portable wireless terminals in communication within the associated macrocell.

The signals 202a, 202b, . . . , 202x corresponding to the portable wireless terminals are input to respective modulators 203a, 203b, . . . , 203x, which use the orthogonal codes as the spectrum spread codes, to be converted into respective modulated signals 204a, 204b, 204x.

The modulator 203z operates to modulate a pilot signal which is utilized to perform the detection in the associated portable wireless terminal, and the handover between the macrocells. In this connection, the pilot signal is modulated to the signal 204z.

Those modulated signals 204a, 204b, . . . , 204x and 204z are compounded into one composite signal 206 in an adder 205 and the composite signal 206 is then amplified into a signal 208 in an amplifier 207 to be emitted into the air through an antenna 209. Incidentally, the modulators 203a, 203b, . . . , 203z operate to subject to the respective input signals to the spectrum spread with the orthogonal codes as the spectrum spread codes.

Figure 3:
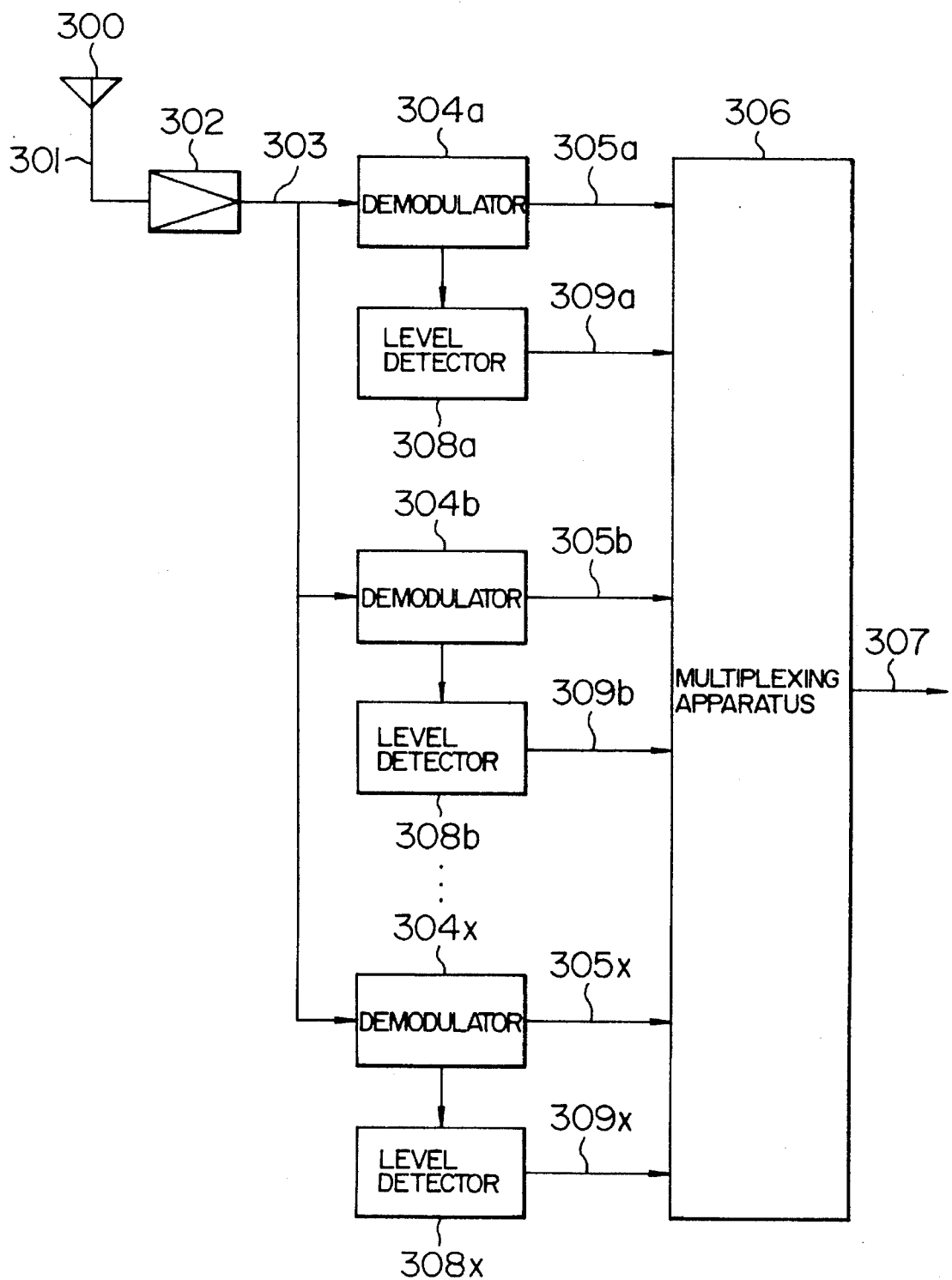
FIG. 3 is a block diagram showing a configuration of a reverse base station 102.

FIG. 3 shows an example of a configuration of the reverse base station 102 provided in the associated microcell.

A received signal 301 which has been input through an antenna 300, is amplified by an amplifier 302 into a signal 303 having a level at which demodulators 304a, 304b, . . . , 304x in the next stage are operated normally. The demodulators 304a, 304b, . . . , 304x are provided in correspondence to the respective portable wireless terminals located in the associated microcell and operate to demodulate the input signal 303 sent from the above-mentioned amplifier 302 into a plurality of demodulated signals 305a, 305b, . . . , 305x. Further, received signal level detectors 308a, 308b, . . . , 308x operate to detect, respectively, the levels of the received signals sent from the portable wireless terminals in the associated microcell to output control signals 309a, 309b, . . . , 309x representing the respective received signal's levels.

Those demodulated signals 305a, 305b, . . . , 305x and control signals 309a, 309b, . . . , 309x are converted into a multiplexing signal 307 by a multiplexing apparatus 306. Then, the multiplexing signal 307 is transmitted to the associated forward base station 101 through the associated channel 106, and then is transferred from the associated forward base station 101 to the mobile communication control office 100 through the associated channel 107. The mobile communication control office 100 then transmits the signal thus received to the public or local area network 109 through the channel 108. As a result, communication is established between the portable wireless terminals in the radio communication system area and the corresponding fixed terminals of the public or local area network 109, or the corresponding portable wireless terminals in the radio communication system area. In addition, the mobile communication control office 100 continuously monitors the levels of the received signals sent from the mobile wireless terminals in the reverse base stations and performs identification of each reverse base station which is to exercise jurisdiction over the associated mobile wireless terminals.

Figure 4:
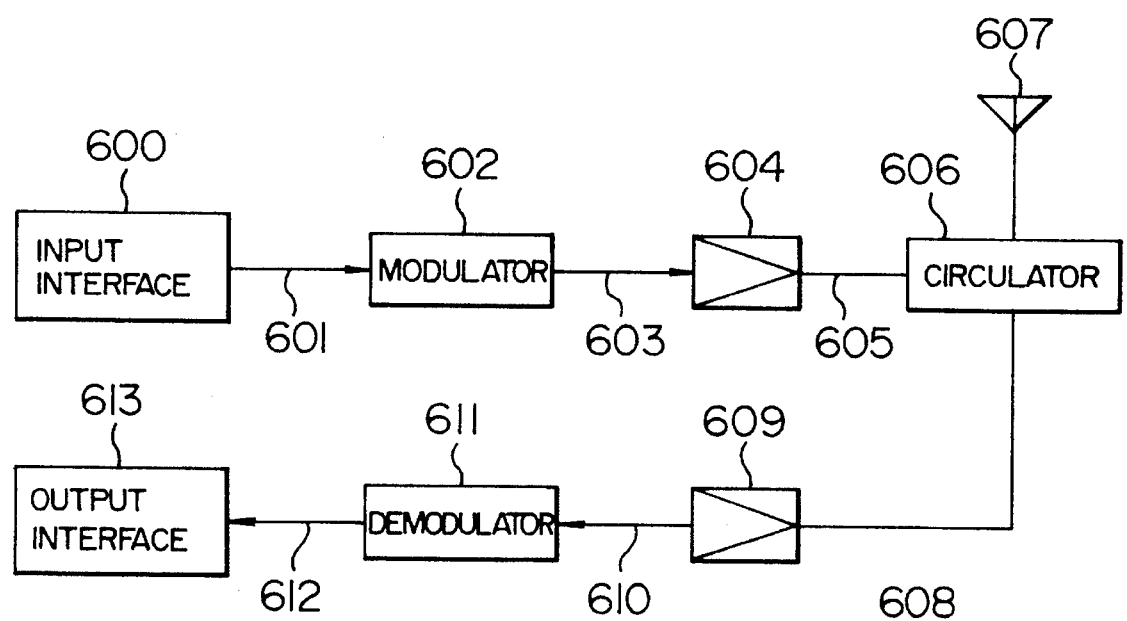
FIG. 4 is a block diagram showing a configuration of a portable wireless terminal 103.

FIG. 4 shows an example of a configuration of the portable wireless terminal 103 shown in FIG. 1.

In the figure, the reference numeral 600 designates an input interface such as a microphone. A signal 601 (such as a sound signal or a data signal) which has been input from the input interface 600 is modulated into a signal 603 by a modulator 602 which uses the pseudo-noise sequence as the spectrum spread codes. Then, this modulated signal 603 is amplified into a signal 605 by an amplifier 604, and then is supplied to an antenna 607 through a circulator 606 to be emitted into the air.

On the other hand, the signal which has been received through the antenna 607 is separated as a received signal 608 by the circulator 606 and then is supplied to an amplifier 609. The received signal 608 is amplified by the amplifier 609 into a signal having the level at which a demodulator 611 in the next stage is operated normally. Then, the resultant signal 610 is demodulated into a demodulated signal 612 by a demodulator 611 and then is output from an output interface 613 such as a speaker.

Next, the description will hereinafter be given with respect to the operation of requesting the call from the portable wireless terminal with reference to FIG. 1.

All the reverse base stations 102 continuously monitor call request signals which are issued from the portable wireless terminals through a common access channel. The portable wireless terminal 103, which intends to make a call, transmits the call request signal to the associated reverse base station through the access channel, which is used commonly by the portable wireless terminals.

In this case, for example, if in the reverse base station 102d, the received signal level of the radio wave signal emitted by the portable wireless terminal 103 is higher than the received signal levels of the radio wave signals emitted from other portable wireless terminals which are already in communication in the reverse base station 102d, it may occur in some cases that the communication signals are interfered by the radio wave signal emitted by the portable wireless terminal 103, and as a result, the communication quality is remarkably degraded. For the purpose of preventing such interference, the transmitted electric power of the radio wave signal emitted by the portable wireless terminal 103 is, even in the case where that portable wireless terminal 103 is at the close range of the reverse base station 102d, gradually increased from the sufficiently low transmitted electric power so as not to invite degradation of the communication quality of other wireless terminals.

When the portable wireless terminal 103 has transmitted the call request signal through the access channel, each of the reverse base stations 102d and 102g which have received that call request signal transmits a control signal representing both the call request signal and the received signal level thereof to the mobile communication control office 100 via both the channels 106 and 107 in this order.

The mobile communication control office 100 which has received those control signals selects the reverse base station having the highest received signal level (the radio base station 102d in this example) as the reverse base station for communication and also specifies the reverse base station having the higher received signal level of the next order (the reverse base station 102g in this example) as the reverse base station for a communication candidate. The mobile communication control office 100 assigns the spectrum spread codes for traffic and the electric power control signals to the individual communication channels of the reverse and forward links of the portable wireless terminal 103 and also notifies the forward base station 101 which exercises jurisdiction over the reverse base station 102d for communication of both the spectrum spread codes for traffic and the power control signals via the associated channel 107.

Then, the above-mentioned forward base station 101 posts (specifies) both the spectrum spread code for traffic and the power control signal of the reverse link, which have been posted from the mobile communication control office 100, to the portable wireless terminal 103, which had issued the request, utilizing a forward link control channel which is the common channel of the wireless terminals similarly to the above-mentioned access channel. In addition, the above-mentioned forward base station 101 posts the above-mentioned spectrum spread code for traffic of reverse link to both the reverse base station 102d for communication and the reverse base station 102g for a communication candidate via the respective channels 106.

The portable wireless terminal 103 which has received the notification subjects the call signal including the dial number of the terminal to be called to the spectrum spread with the above-mentioned specified spectrum spread code for the reverse link traffic, and transmits the resultant signal with the transmitted electric power which is controlled on the basis of the specified power control signal. The reverse base station 102d for communication demodulates the received signal sent from the portable wireless terminal 103 using the above-mentioned specified spectrum spread code for traffic. This resultant signal is multiplexed with the received signals sent from other portable wireless terminals and then is transferred to the mobile communication control office 100 via the channel 106, the forward base station 101 and the channel 107 in this order to be connected to the public or local area network 109.

On the other hand, the signal which is to be transmitted from the network 109 to the portable wireless terminal 103 is transferred to the forward base station 101 via the channel 108, the mobile communication control office 100 and the channel 107 in this order. Then, the forward base station 101 subjects the signal thus received to the spectrum spread using the spectrum spread code for the forward link traffic corresponding to the destination portable wireless terminal 103 and transmits the resultant signal in the form of the radio wave signal.

Next, the description will hereinbelow be given with respect to the call-in operation for the portable wireless terminal with reference to FIG. 1.

From the forward base station 101, a pilot signal is sent with the fixed electric power. The portable wireless terminal 103 compares the received signal levels of the pilot signals sent from a plurality of forward base stations, thereby identifying the nearest forward base station 101. The receiving result of the pilot signals is transmitted in the form of a control signal to be posted to the mobile communication office 100 via the reverse base station 102, the channel 106, the forward base station and the channel 107 in this order. Then, on the basis of the receiving result of the pilot signals, the mobile communication control office 100 continuously manages the correspondence relationship between the portable wireless terminal 103 and the forward base station, which is to exercise jurisdiction over the terminal 103, and transmits, in the case where the call request is issued from another terminal to the portable wireless terminal 103, the control signal for call connection to the forward base station 101 which is closest to the portable wireless terminal 103. Then, the forward base station 101 issues the call-in request to the portable wireless terminal 103 using a paging channel as the common channel. Thereafter, the call connection is performed by the same procedure as that in the call operation.

Next, the description will hereinbelow be given with respect to the behavior of handover of the portable wireless terminal.

Figure 5:
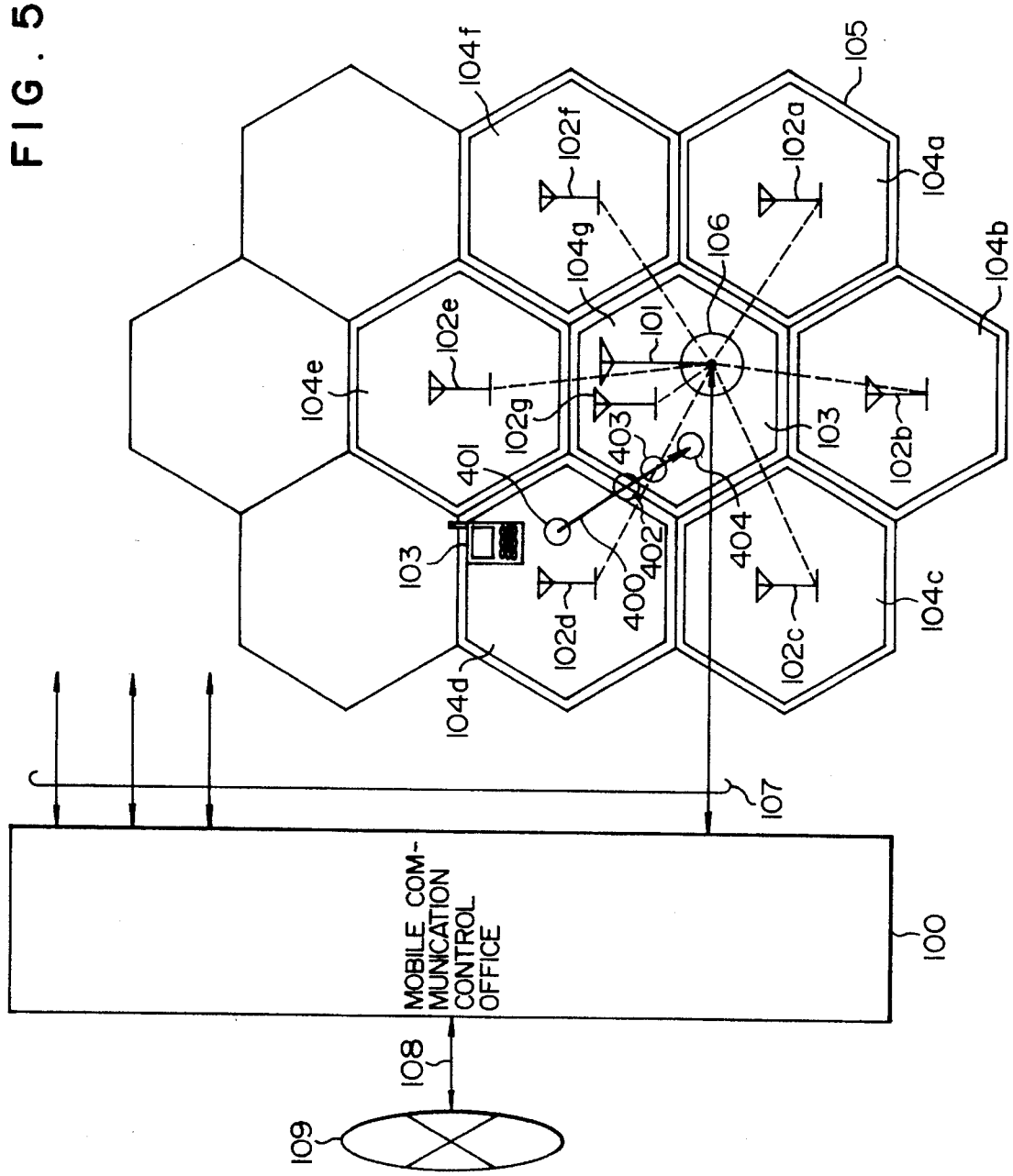
FIG. 5 is a schematic view useful in explaining the behavior of handover.

Now, the specific case where as indicated by an arrow 400 in FIG. 5, the portable wireless terminal 103 of interest is moved from the microcell 104d to the microcell 104g adjacent thereto is taken as an example. In this case, it is assumed that the relationship shown in FIG. 6 is established between the position of the portable wireless terminal 103 of interest and the received signal level of the signal sent from the portable wireless terminal 103 in the adjacent reverse base stations within the microcells 104d and 104g through which the portable wireless terminal 103 passes in turn.

At the time when the portable wireless terminal 103 is located in a position a 401, the base station 102d becomes the reverse base station for communication, and the base station 102g becomes the reverse base station for a communication candidate. While the portable wireless terminal 103 is moved from the position a 401 towards a next position b 402 along the arrow 400, the portable wireless terminal 103 controls, on the basis of the power control signal sent from the mobile communication control office 100 via the forward base station 101, the transmitted electric power so as for the received electric power in the reverse base station 102d for communication to be fixed. When the portable wireless terminal 103 is further moved to reach the boundary position b 402 between the microcells 104d and 104g, the received signal's level at the reverse base station 102d for communication and that at the reverse base station 102g for a communication candidate become substantially equal to each other. Further, at the time when the portable wireless terminal 103 reaches a next position c 403, the received signal's level at the reverse base station 102d for communication becomes lower than that at the reverse base station 102g for a communication candidate.

The mobile communication control office 100 monitors, all the time, the received signal level at the reverse base station 102d for communication and that at the reverse base station 102g for a communication candidate. Thus, at the point in time when the magnitude relationship therebetween is reversed, the mobile communication control office 100 switches the reverse base station for communication from the old base station 102d to the new base station 102d and also switches the reverse base station for a communication candidate from the old base station 102g to the new base station 102d. Incidentally, as the actual problem, for the purpose of preventing the oscillation phenomenon which may occur in the case where the portable wireless terminal 103 crosses the boundary position b 402 to go back and forth frequently between the microcells 104d and 104g, it is to be desired that such a switching operation is controlled so as not to be activated until after the magnitude relationship between the receiving signal level at the reverse base station 102d for communication and that at the reverse base station 102g for a communication candidate is reversed, the difference therebetween exceeds a fixed value.

Figure 6:
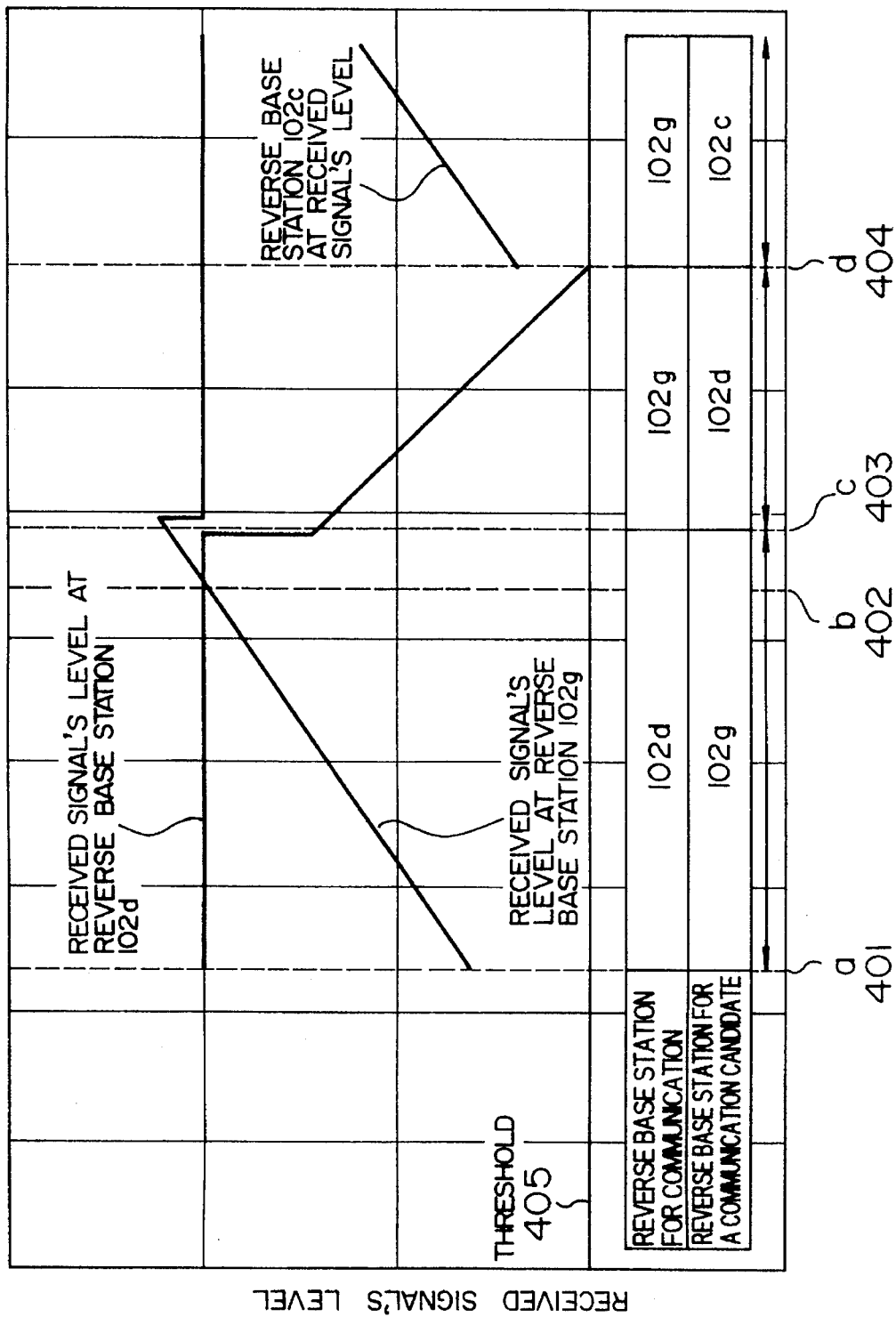
FIG. 6 is a view showing the relationship between the position of the portable wireless terminal in movement and the received signal's level of the signal transmitted from the portable wireless terminal in the reverse base station.

When the portable wireless terminal 103 is further moved to reach a next position d 404, the received signal level at the reverse base station 102d for a communication candidate becomes lower than a predetermined threshold 405 shown in FIG. 6. At this time, the mobile communication control office 100 posts the spectrum spread code for traffic of the reverse link, which is to be assigned to the portable wireless terminal 103, to the reverse base stations 102a, 102b, . . . , 102f other than the reverse base station 102d, which has been the communication candidate until that time, out of all the reverse base stations adjacent to the reverse base station 102g for communication and instructs those reverse base stations to report their received signal levels of the signal sent from the portable wireless terminal 103. On the basis of the responses from those radio base stations, the mobile communication control office 100 specifies newly the reverse base station 102c having the highest received signal's level as the reverse base station for a communication candidate.

In the above-mentioned description, one reverse base station having the higher received signal level of the next order is specified as the reverse base station for a communication candidate. However, alternatively, a plurality of reverse base stations may be previously specified. Incidentally, in the case where the portable wireless terminal is moved between the adjacent macrocells, in addition to the above-mentioned behavior of handover, the operation of changing the position registration of the portable wireless terminal from the forward base station of the macrocell in which the portable wireless terminal has been located until that time to the forward base station of the new macrocell is also performed altogether.

As apparent from the above-mentioned description, according to the radio communication system of the present invention, the single forward base station was installed in the prior art system, whereas in the present invention, a plurality of forward base stations are installed, a plurality of reverse base stations are installed in the associated macrocell as the service area of the forward base stations to form a plurality of microcells, and each forward base station is connected to the mobile communication control office through the associated channel. Therefore, the transmitted power of the portable wireless terminal has only to be weak. In addition, the installation number of radio base stations and mobile communication control offices is increased if necessary, whereby the service area can be readily enlarged.

In addition, in accordance with the received signal levels of the signals transmitted from the portable wireless terminals in the reverse base stations, the mobile communication control office specifies each reverse base station which is to exercise jurisdiction over each portable wireless terminals, thereby realizing the handover. Therefore, each portable wireless terminal can be moved within the associated area while maintaining the communication thereof.

Further, in the present invention, since the position registration of the portable wireless terminals is managed in units of macrocell over which the associated forward base station exercises jurisdiction, as compared with the system in which that management is performed in units of microcell, the processing for the position management becomes easy.

We claim:

1. A radio communication system for establishing a communications link for at least one mobile wireless terminal operating within a region of interest covered by said system, comprising:

a plurality of forward base stations each forming a macrocell containing a single forward base station;

a plurality of sets of reverse base stations, each set located within the macrocell of a respective forward base station for communicating with said forward base station through respective channels, the reverse base stations within each macrocell forming microcells therein; and at least one mobile communication control office connected between said plurality of forward base stations and a public or local area network, wherein a forward communications link is established between said public or local area network and said mobile wireless terminal by channels connecting said public or local area network, said mobile communications office, a first one of said forward base stations, and said mobile wireless terminals, forward communication between said one of said forward base stations and said mobile wireless terminal taking place solely unidirectionally from said first one of said forward base stations to the mobile wireless terminal, and a reverse communications link between said mobile wireless terminal and said public or local area network being formed by channels connecting said mobile wireless terminal, one of said reverse base stations, a second one of said forward base stations, said mobile communications control office, and said public or local area network reverse communication between said mobile wireless terminal and said one of said reverse base stations taking place solely unidirectionally from said mobile wireless terminal to said one of said reverse base stations.

2. A method for establishing a communications link for a mobile wireless terminal within a radio communication system, said system comprising a plurality of forward base stations each forming a macrocell containing a single forward base station, a plurality of sets of reverse base stations each set located within the macrocell and connected to a respective forward base station, and at least one mobile communication control office connected between said plurality of forward base stations and a public or local area network, said method comprising the steps of:

transmitting a call signal from said mobile wireless terminal along a common access channel for receipt by a number of said reverse base stations;

transmitting control signals from each of said number of reverse base stations to said communication control office via forward base stations associated with each of said number of reverse base stations, said control signals containing information representing both the call signal and a level of the call signal as received by respective ones of said number of reverse base stations;

selecting at said communication control office a reverse base station from said number of reverse base stations having the highest signal level, as received by respective ones of said number of reverse base stations;

forming at said communication control office a communications link connecting the mobile wireless terminal, said selected reverse base station, the forward base station associated with said selected base station, the communication control office, and the public or local area network, direct communication between said mobile wireless terminal and said selected reverse base station taking place solely unidirectionally from said wireless terminal to said selected reverse base station.

3. The method of claim 2, further comprising the step of:

selecting a reverse base station having a signal level which is second in order to the reverse base station having the received highest signal level as a reverse base station that will be used to perform a handover function if said mobile wireless terminal should cross a cell boundary.

4. The method of claim 3, further comprising the step of:

monitoring continuously the signal level of the reverse base station having the highest received signal level; and switching the communications link to pass through the reverse base station which is second in order to the reverse base station having the highest received signal level when a magnitude of the received signal level corresponding to the reverse base station highest received signal level falls below a magnitude of the signal level of the reverse base station having said second order signal level.

5. A method for establishing a communications link for a mobile wireless terminal within a radio communication system, said system comprising a plurality of forward base stations each forming a macrocell containing a single forward base station, a plurality of sets of reverse base stations each set located within the macrocell and connected to a respective forward base station, and at least one mobile communication control office connected between said plurality of forward base stations and a public or local area network, said method comprising the steps of:

transmitting pilot signals of fixed power from each of said forward base stations for receipt by said mobile wireless terminal;

comparing relative levels of said pilot signals as received by said mobile wireless terminal to identify a forward base station nearest to said mobile wireless terminal;

transmitting from said wireless terminal via the reverse base stations a first control signal containing information representing said nearest forward base station for receipt by said communication control office;

continuously managing the position of the mobile wireless terminal relative to macrocells in the system based on said first control signal;

transmitting from said communication control office, when a call-in request signal is issued from a public or local area network to the mobile wireless terminal, a second control signal to the forward base station;

transmitting a call-in request from the forward base station to the mobile wireless terminal through a paging channel, direct communication between the forward base station and the mobile wireless terminal taking place solely unidirectionally from said forward base station to the mobile wireless terminal.

* * * * *